United States Patent Office.

ZENAS CRANE WARREN AND HENRY CARLETON HULBERT, OF BROOKLYN, NEW YORK, ASSIGNORS TO HENRY CARLETON HULBERT.

Letters Patent No. 94,797, dated September 14, 1869.

IMPROVED SIZING FOR PAPER MANUFACTURERS AND OTHERS.

The Schedule referred to in these Letters Patent and making part of the same.

*To all whom it may concern:*

Be it known that we, ZENAS CRANE WARREN and HENRY CARLETON HULBERT, both of Brooklyn, in the State of New York, have invented a new and useful Preparation of Composite-Sizing; and that the following is a full, clear, and exact description and specification of our said invention.

Our invention is an improvement upon the composite-sizing for sizing paper, described in the patent granted to H. C. HULBERT, assignee of Z. C. WARREN, the 23d day of March, A. D. 1869, and consists of starch-material compounded with nitrate of potash.

The kind of starch-material which we have used with success is pearl sago, or sago flour, and we prefer to compound it with the nitrate of potash, by grinding the two together in a dry state, so that the compound when made is a fine dry powder, that can be conveniently packed and transported to paper-mills, where it may be dissolved as required.

The proportions in which we have compounded the ingredients are: sago flour, one hundred pounds; nitrate of potash, five pounds; but the proportions may be varied as found expedient, the action of the nitrate of potash being to render the solution of the article more liquid than that of sago alone, which action we believe to be due to the nitric acid combined in the nitrate.

When the article is to be used, it is to be dissolved in water.

The mode in which we have performed this operation is to stir the article into cold water in the proportions of one pound of the article for each gallon of water. The mixture is then boiled by blowing steam into it, by means of an open-ended steam-pipe, and the boiling is continued for an hour after it commences.

After the solution has boiled an hour, we add to the solution alum in the proportion of from five to fifteen pounds to each one hundred pounds of the article, and we sometimes also add carbonate of soda in the proportion of half a pound for each one hundred pounds of the article.

As the steam condenses in the solution, the product is about one and a half gallon of dissolved sizing for every pound of the dry sizing employed.

The dissolved sizing is applied to the surfaces of paper in the same manner as tub-sizing with animal sizing, the solution being maintained at a temperature of from 100° to 150° Fahrenheit, and the temperature which we have found most suitable being about 130° Fahrenheit.

The paper is subsequently dried and calendered.

Instead of compounding the ingredients by grinding them together, they may be ground separately and then mixed together, or they may be separately added to the water which is used to dissolve the compound, if this course be deemed expedient.

Although we have found sago flour to be the kind of starch-material best adapted to the manufacture of our composition, we have succeeded in using other starch-materials for the purpose, such, for example, as potato-starch, which has been treated in the mode described in the said patent granted to said HULBERT.

The said preparation of composite-sizing is much cheaper than the animal-sizing in common use, while it may be prepared in a dry state, and therefore be as readily transported as animal-sizing material.

The said preparation also does not impart an offensive smell to the paper, as animal-sizing does; neither does it affect the color of the paper. Paper sized with it also is better adapted to being dried by hot rolls than that containing animal-sizing, and it contracts less in drying.

We claim as our invention, and desire to secure by Letters Patent—

The improved preparation of composite-sizing hereinbefore described, consisting of starch-material and nitrate of potash.

In testimony whereof, we have hereto set our hands, this 11th day of August, A. D. 1869.

Z. C. WARREN.
H. C. HULBERT.

Witnesses:
E. S. RENWICK,
JOHN RATHBONE, Jr.